United States Patent
Zhang et al.

(10) Patent No.: US 10,291,427 B2
(45) Date of Patent: May 14, 2019

(54) DEVICE SELECTION METHOD AND APPARATUS

(71) Applicant: Huawei Device Co., Ltd., Shenzhen (CN)

(72) Inventors: Yajun Zhang, Shenzhen (CN); Yu Zhu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 493 days.

(21) Appl. No.: 14/837,971

(22) Filed: Aug. 27, 2015

(65) Prior Publication Data
US 2015/0365248 A1 Dec. 17, 2015

Related U.S. Application Data

(63) Continuation of application No. PCT/CN2014/075927, filed on Apr. 22, 2014.

(51) Int. Cl.
H04W 4/02 (2018.01)
H04W 4/21 (2018.01)
H04L 12/28 (2006.01)
G06F 3/0484 (2013.01)

(52) U.S. Cl.
CPC ........ *H04L 12/282* (2013.01); *G06F 3/04842* (2013.01); *H04W 4/023* (2013.01); *H04W 4/026* (2013.01); *H04W 4/21* (2018.02)

(58) Field of Classification Search
CPC ....... G06T 19/006; G06T 7/00; G06F 3/0346; G06F 3/04842; G02B 27/01; G05B 2219/32014; G05B 2219/2642; G08C 2201/91; H04W 4/023; H04W 4/026–4/028; H04W 4/02–4/046; H04L 12/2816–12/2821; H04L 12/282
See application file for complete search history.

(56) References Cited

U.S. PATENT DOCUMENTS 8,269,624 B2    9/2012  Chen et al.
9,721,462 B2 *  8/2017  Hirabayashi ........... G08C 17/02
(Continued)

FOREIGN PATENT DOCUMENTS

CN  102195706 A  9/2011
CN  102204271 A  9/2011
(Continued)

OTHER PUBLICATIONS

Belloni, F., "Bringing Navigation Indoors," NRC Radio Systems Laboratory, Nokia Research Center, 2010, 41 pages.

*Primary Examiner* — Jennifer N To
*Assistant Examiner* — Liang Y Li
(74) *Attorney, Agent, or Firm* — Slater Matsil, LLP

(57) ABSTRACT

A device selection method and apparatus is disclosed, where the method includes: responding, by a control device, to a selection operation of a user, and determining a pointing direction of the control device and/or a deflection angle of the control device according to sensing data collected by a sensor of the control device; and determining, according to the pointing direction of the control device and/or the deflection angle of the control device, a home network device selected by the user, so that a correctness rate of home network device selection is increased effectively.

3 Claims, 7 Drawing Sheets

(56) References Cited

U.S. PATENT DOCUMENTS

| | | | |
|---|---|---|---|
| 2004/0121725 A1* | 6/2004 | Matsui | G08C 17/02 |
| | | | 455/3.06 |
| 2007/0236381 A1* | 10/2007 | Ouchi | G08C 17/00 |
| | | | 341/176 |
| 2009/0054108 A1 | 2/2009 | Kito | |
| 2011/0037712 A1* | 2/2011 | Kim | H04M 1/7253 |
| | | | 345/173 |
| 2012/0077515 A1 | 3/2012 | Oishi | |
| 2012/0117249 A1* | 5/2012 | Jung | H04L 12/2809 |
| | | | 709/227 |
| 2013/0108113 A1 | 5/2013 | Zhao et al. | |
| 2013/0181813 A1* | 7/2013 | Norlen | G08C 19/16 |
| | | | 340/9.1 |
| 2013/0198638 A1 | 8/2013 | Na et al. | |
| 2013/0247117 A1* | 9/2013 | Yamada | G08C 17/02 |
| | | | 725/93 |

FOREIGN PATENT DOCUMENTS

| | | |
|---|---|---|
| CN | 102377872 A | 3/2012 |
| CN | 102891784 A | 1/2013 |
| CN | 103091662 A | 5/2013 |
| EP | 2451122 A2 | 5/2012 |
| EP | 2930959 A1 | 1/2014 |

\* cited by examiner

DEVICE SELECTION METHOD AND APPARATUS

This application is a continuation of PCT Application No. PCT/CN2014/075927, filed on Apr. 22, 2014, which is incorporated herein by reference in its entirety.

TECHNICAL FIELD

Embodiments of the present invention relate to the field of communications technologies, and in particular, to a device selection method and apparatus.

BACKGROUND

With the development of digital homes and widespread digitalization of consumer electronics (Consumer Electronics, CE for short) products, an increasing number of digital entertainment devices and home appliance products appear in families. Connecting the home network devices in a wired or wireless manner to form a home network to implement functions such as content sharing or mutual control is a digital home network concept that the industry is conceiving and striving to achieve.

Currently, more and more consumer electronics devices support a media sharing function. When sharing media, a user needs to select a source device and a target device. Consumer electronics devices are increasingly appearing in home networks, and each device has its own product model and naming rule. Users are always perplexed by product models that are privately defined by vendors, and are thus unable to distinguish specific devices corresponding to these product models. For example, a product model of Huawei mobile phone A is U9510, and a user uses the SSDP protocol and finds that U9510 is displayed for the device, but it is difficult for the user to tell that U9510 and A denote a same device.

A media sharing protocol of a conventional home network is to first use a service discovery protocol to discover home network devices in a same home network, and when a user uses a mobile terminal to select a home network device to share resources in the mobile terminal, models of all home network devices in the home network are displayed on the mobile terminal for selection by the user. However, currently, because many home network devices exist in a home network and device models are also complex, it is difficult for the user to select a home network device correctly, which degrades user experience.

SUMMARY

Embodiments of the present invention provide a device selection method and apparatus, in which a home network device is selected according to a pointing direction and/or a deflection angle of a control device in a home network, so as to increase a correctness rate of home network device selection and improve user experience.

A first aspect of the present invention provides a device selection method, including:

responding, by a control device, to a selection operation of a user, and determining a pointing direction of the control device and/or a deflection angle of the control device according to sensing data collected by a sensor of the control device; and determining, according to the pointing direction of the control device and/or the deflection angle of the control device, a home network device selected by the user.

In a first possible implementation manner of the first aspect, the determining, according to the pointing direction of the control device, a home network device selected by the user includes:

determining a to-be-searched regional range by using location information of the control device and the pointing direction of the control device; and searching a home network device list of the control device, and determining that a home network device whose location information is in a regional range is a candidate home network device, where the home network device list includes location information of all home network devices in a home network; and displaying the candidate home network device on a display interface of the control device for the user to perform selection; or displaying, on a display interface of the control device, a home network device that is in the candidate home network device and supports a media format of to-be-shared data of the control device for the user to perform selection.

In a second possible implementation manner of the first aspect, the determining, according to the deflection angle of the control device, a home network device selected by the user includes:

calculating, according to location information of a home network device in a home network and location information of the control device, an included location angle of the home network device, where the included location angle is an included angle between the home network device and the control device; and selecting a home network device whose included location angle is closest to the deflection angle of the control device as the home network device selected by the user.

In a third possible implementation manner of the first aspect, the determining, according to the pointing direction of the control device and the deflection angle of the control device, a home network device selected by the user includes:

determining a candidate home network device in a home network according to the pointing direction of the control device; and selecting, according to the deflection angle of the control device, a home network device from the candidate home network device as the home network device selected by the user.

With reference to the third possible implementation manner of the first aspect, in a fourth possible implementation manner, the determining a candidate home network device in a home network according to the pointing direction of the control device includes:

determining a to-be-searched regional range by using location information of the control device and the pointing direction of the control device; and searching a home network device list of the control device, and determining that a home network device whose location information is in the regional range is the candidate home network device, where the home network device list includes location information of all home network devices in the home network.

With reference to the third possible implementation manner of the first aspect or the fourth possible implementation manner of the first aspect, in a fifth possible implementation manner of the first aspect, the selecting, according to the deflection angle of the control device, a home network device from the candidate home network device as the home network device selected by the user includes:

calculating, according to location information of the candidate home network device and location information of the control device, an included location angle of the candidate home network device, where the included location angle is an included angle between the candidate home network device and the control device; and determining, from the candidate home network device according to the included location angle of the candidate home network device and the deflection angle of the control device, the home network device selected by the user.

With reference to the fifth possible implementation manner of the third aspect, in a sixth possible implementation manner of the third aspect, the determining, from the candidate home network device according to the included location angle of the candidate home network device and the deflection angle of the control device, the home network device selected by the user includes:

if a proportion of a difference, which is between an included location angle of a candidate home network device whose included location angle is closest to the deflection angle of the control device and the deflection angle of the control device, in the deflection angle is less than a preset value, determining that the candidate home network device whose included location angle is closest to the deflection angle of the control device is the home network device selected by the user; and if the proportion of the difference, which is between an included location angle of a candidate home network device whose included location angle is closest to the deflection angle of the control device and the deflection angle of the control device, in the deflection angle is greater than or equal to the preset value, displaying the candidate home network device on a display interface of the control device, or displaying, on a display interface of the control device, a home network device that is in the candidate home network device and supports a media format of to-be-shared data of the control device, for the user to perform selection.

With reference to the fifth possible implementation manner of the third aspect, in a seventh possible implementation manner of the third aspect, the determining, from the candidate home network device according to the included location angle of the candidate home network device and the deflection angle of the control device, the home network device selected by the user includes:

selecting, from the candidate home network device, a home network device that supports a media format of to-be-shared data of the control device as a home network device set;

if the home network device set includes one home network device, determining that the home network device in the home network device set is the home network device selected by the user; and if the home network device set includes at least two home network devices, determining that a home network device, in the home network device set, whose included location angle is closest to the deflection angle of the control device is the home network device selected by the user.

A second aspect of the present invention provides a control device, including:

a first determining unit, configured for the control device to respond to a selection operation of a user, and determine a pointing direction of the control device and/or a deflection angle of the control device according to sensing data collected by a sensor of the control device; and a device determining unit, configured to: after the first determining unit determines the pointing direction of the control device and/or the deflection angle of the control device, determine, according to the pointing direction of the control device and/or the deflection angle of the control device, a home network device selected by the user.

In a first possible implementation manner of the second aspect, the device determining unit includes:

a second determining unit, configured to: after the first determining unit determines the pointing direction of the control device, search a home network device list of the control device, and determine that a home network device whose location information is in a regional range is a candidate home network device, where the home network device list includes location information of all home network devices in a home network; and a third determining unit, configured to: after the second determining unit obtains the candidate home network device, display the candidate home network device on a display interface of the control device for the user to perform selection; or display, on a display interface of the control device, a home network device that is in the candidate home network device and supports a media format of to-be-shared data of the control device for the user to perform selection.

In a second possible implementation manner of the second aspect, the device determining unit includes:

an included angle calculating unit, configured to: after the first determining unit determines the deflection angle of the control device, calculate, according to location information of a home network device in a home network and location information of the control device, an included location angle of the home network device, where the included location angle is an included angle between the home network device and the control device; and a fourth determining unit, configured to: after the included angle calculating unit determines the included location angle of the home network device, select a home network device whose included location angle is closest to the deflection angle of the control device as the home network device selected by the user.

In a third possible implementation manner of the second aspect, the device determining unit includes:

a selection determining unit, configured to: after the first determining unit determines the pointing direction of the control device and the deflection angle of the control device, determine a candidate home network device in a home network according to the pointing direction of the control device; and a selecting unit, configured to: after the selection determining unit determines the candidate home network device, select, according to the deflection angle of the control device, a home network device from the candidate home network device as the home network device selected by the user.

With reference to the third possible implementation manner of the second aspect, in a fourth possible implementation manner of the second aspect, the selection determining unit includes:

a fifth determining unit, configured to: after the first determining unit completes execution, determine a to-be-searched regional range by using location information of the control device and the pointing direction of the control device; and a sixth determining unit, configured to: after the fifth determining unit obtains the regional range, search a home network device list of the control device, and determine that a home network device whose location information is in the regional range is the candidate home network device, where the home network device list includes location information of all home network devices in the home network.

With reference to the third possible implementation manner of the third aspect or the fourth possible implementation manner of the third aspect, in a fifth possible implementation manner of the third aspect, the selecting unit includes:

a calculating unit, configured to: after the selection determining unit obtains the candidate home network device, calculate, according to location information of the candidate home network device and location information of the control device, an included location angle of the candidate home network device, where the included location angle is an included angle between the candidate home network device and the control device; and a seventh determining unit, configured to: after the calculating unit obtains the included location angle of the candidate home network device, determine, from the candidate home network device according to the included location angle of the candidate home network device and the deflection angle of the control device, the home network device selected by the user.

With reference to the fifth possible implementation manner of the second aspect, in a sixth possible implementation manner of the second aspect, the seventh determining unit includes:

an eighth determining unit, configured to: after the calculating unit obtains the included location angle of the candidate home network device, if a proportion of a difference, which is between an included location angle of a candidate home network device whose included location angle is closest to the deflection angle of the control device and the deflection angle of the control device, in the deflection angle is less than a preset value, determine that the candidate home network device whose included location angle is closest to the deflection angle of the control device is the home network device selected by the user; and a displaying unit, configured to: after the calculating unit obtains the included location angle of the candidate home network device, if the proportion of the difference, which is between an included location angle of a candidate home network device whose included location angle is closest to the deflection angle of the control device and the deflection angle of the control device, in the deflection angle is greater than or equal to the preset value, display the candidate home network device on a display interface of the control device, or display, on a display interface of the control device, a home network device that is in the candidate home network device and supports a media format of to-be-shared data of the control device, for the user to perform selection.

With reference to the fifth possible implementation manner of the second aspect, in a seventh possible implementation manner of the second aspect, the seventh determining unit includes:

a device selecting unit, configured to: after the calculating unit obtains the included location angle of the candidate home network device, select, from the candidate home network device, a home network device that supports a media format of to-be-shared data of the control device as a home network device set; and a ninth determining unit, configured to: after the device selecting unit determines the home network device set, if the home network device set includes one home network device, determine that the home network device in the home network device set is the home network device selected by the user; and if the home network device set includes at least two home network devices, determine that a home network device, in the home network device set, whose included location angle is closest to the deflection angle of the control device is the home network device selected by the user.

It can be seen from the foregoing technical solution that the embodiments of the present invention have the following advantages:

A control device responds to a selection operation of a user, and determines a pointing direction of the control device and/or a deflection angle of the control device according to sensing data collected by a sensor of the control device; and determines, according to the pointing direction of the control device and/or the deflection angle of the control device, a home network device selected by the user. In this way, the control device can effectively increase a correctness rate of home network device selection and improve user experience.

DETAILED DESCRIPTION OF ILLUSTRATIVE EMBODIMENTS

Figure 1:
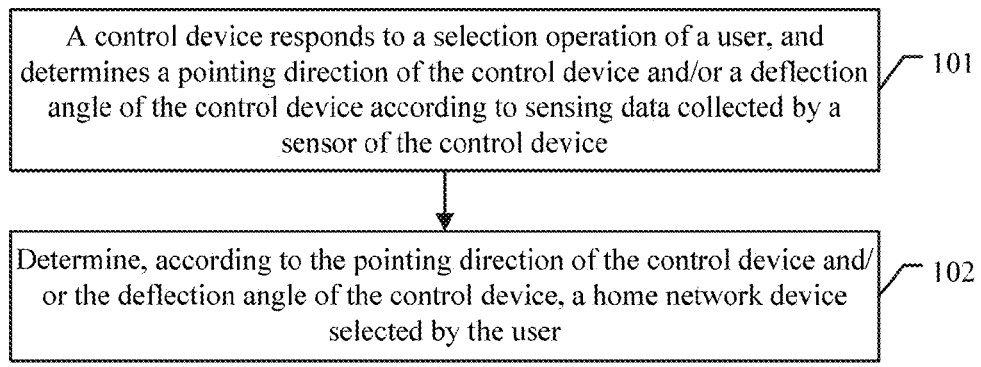
FIG. 1 is a schematic diagram of a device selection method according to an embodiment of the present invention.

Embodiments of the present invention provide a device selection method and apparatus, in which a home network device is selected according to a pointing direction and/or a deflection angle of a control device in a home network, so as to increase a correctness rate of home network device selection and improve user experience.

In the embodiments of the present invention, a home network includes a control device, an indoor positioning base station, a location server, and a home network device, where the control device is mostly a personal terminal device such as a smartphone or a tablet computer and is used to control the home network device, and the control device includes a Bluetooth low energy (Bluetooth Low Energy, BLE for short) function or a Wi-Fi function. The indoor positioning base station is an indoor positioning base station with a wireless positioning function, and is capable of determining location information of the control device and the home network device in the home network by using a BLE indoor positioning technology or a Wi-Fi indoor positioning technology. The location server is connected to the indoor positioning base station in a wired or wireless manner, and in the location server, indoor map information of the home network is stored and the indoor positioning base station may be configured.

the home network device and the control device in the home network are determined by using a BLE indoor positioning technology or a Wi-Fi indoor positioning technology.

After discovering a home network device in the home network, the control device may acquire location information, a BLE address, and a Wi-Fi MAC address of the home network device from the location server, and saves the information about the home network device into an existing home network device list, for which reference may be made to Table 1:

TABLE 1

| Device | IP address | Location information | Device ID | BLE address | Wi-Fi MAC address |
| --- | --- | --- | --- | --- | --- |
| Television set | 192.168.125.1 | (x1, y1, z1) | 11.123.456.1 | D4:87:D8:94:11:22 | 00:37:6D:B3:11:22 |
| Projector | 192.168.125.2 | (x2, y2, z2) | 11.123.456.2 | D4:87:D8:94:33:44 | 00:37:6D:B3:33:44 |
| Smartphone | 192.168.125.3 | (x3, y3, z3) | 11.123.456.3 | D4:87:D8:94:55:66 | 00:37:6D:B3:55:66 |

It should be noted that, in the embodiments of the present invention, a reference coordinate system is configured in the location server in advance, and the indoor positioning base station performs positioning for the control device and the home network device based on the reference coordinate system, so as to determine the location information of the control device and the home network device, where the reference coordinate system is a three-dimensional coordinate system.

In the embodiments of the present invention, the control device may use the Simple Service Discovery Protocol (Simple Service Discovery Protocol, SSDP for short) to discover a home network device in a home network. It should be noted that a home network device mentioned in the embodiments of the present invention may be a universal plug and play (Universal Plug and Play, UPnP for short) device. The control device may receive an SSDP message fed back by a home network device. The SSDP message includes an identity (Identity ID for short), an Internet Protocol (Internet Protocol, IP for short) address, and a device type that are of the home network device; the control device may further use the UPuP protocol to acquire information about a media format supported by the home network device. By analyzing the information about a media format supported by the home network device and the device type, it may be determined what specific device the home network device is. For example, if the control device uses an SDDP message to determine that the device type of the home network device is digital media renderer (Digital Media Renderer, DMR for short), and uses the information about a media format supported by the device to determine that the home network device supports a Joint Photographic Experts Group (Joint Photographic Experts Group, JPEG for short) format and a Moving Picture Experts Group Audio Layer III (Moving Picture Experts Group Audio Layer III, MP3 for short) format, the control device may determine that the home network device is a video media play device such as a smart television set or a high definition television set.

In the embodiments of the present invention, an indoor positioning base station is configured for the location server, and by means of the indoor positioning base station, location information, BLE addresses, and Wi-Fi MAC addresses of It should be noted that the BLE indoor positioning technology or the Wi-Fi indoor positioning technology used by the location server belongs to the prior art, and details are not described herein again.

By using the foregoing device discovery and indoor positioning technologies, each control device in the home network can save information about all home network devices in the home network.

In the embodiments of the present invention, a home network device may be selected by using a saved home network device list. Referring to FIG. 1, which is an embodiment of a device selection method according to an embodiment of the present invention, the method includes:

101. A control device responds to a selection operation of a user, and determines a pointing direction of the control device and/or a deflection angle of the control device according to sensing data collected by a sensor of the control device.

In this embodiment of the present invention, the user may use the control device to control a home network device in a home network. For example, the user may connect a smartphone to a smart television set, and transmit a video file in the smartphone to the smart television set, so that the video file can be played by the smart television set.

In this embodiment of the present invention, when using the control device to select a device, the user may use the control device to perform a selection operation. The control device responds to the selection operation, and determines the pointing direction of the control device and/or the deflection angle of the control device according to sensing data collected by a sensor, where the selection operation may be that: the user holds the control device toward a home network device that the user wants to select, and holds on for a preset time and then presses a confirm button or a confirm key, so that the sensor of the control device transmits sensing data to a processor in the control device, where the sensing data is obtained by sensing when the user performs the selection operation. For example, the user may aim a mobile phone at a television set that the user wants to select, hold on for 2 to 3 seconds and press a confirm button. Therefore, according to the technical solution in this embodiment of the present invention, the mobile phone determines that the television set is a device selected by the mobile phone. If the user wants to control a sounder after using the mobile phone to select the television set, the user may aim the mobile phone at the sounder, hold on for 2 to 3 seconds and press the confirm button, so that the mobile phone can also determine, according to the technical solution in this embodiment of the present invention, that the sounder is a device selected by the mobile phone. In this way, the selected device is switched. The deflection angle is a deflection angle in three-dimensional space, that is, a deflection angle on the X axis, Y axis, or Z axis in a coordinate system based on a reference coordinate system.

It should be noted that, in this embodiment of the present invention, a method for the control device to determine the direction pointed to by the control device is preset in the control device. Specifically, a direction pointed to outward straightly by a position or a part on the control device is the direction pointed to by the control device. For example, it is preset that a direction pointed to outward by the front top of the mobile phone is the direction pointed to by the mobile phone.

102. Determine, according to the pointing direction of the control device and/or the deflection angle of the control device, a home network device selected by the user.

In this embodiment of the present invention, after obtaining the pointing direction of the control device and/or the deflection angle of the control device by using the sensing data collected by sensor, the control device determines, according to the pointing direction of the control device and/or the deflection angle of the control device, the home network device selected by the user.

In this embodiment of the present invention, a control device responds to a selection operation of a user, and determines a pointing direction of the control device and/or a deflection angle of the control device according to sensing data collected by a sensor of the control device; and determines, according to the pointing direction of the control device and/or the deflection angle of the control device, a home network device selected by the user. In this way, the control device can effectively increase a correctness rate of home network device selection and improve user experience.

Figure 2:
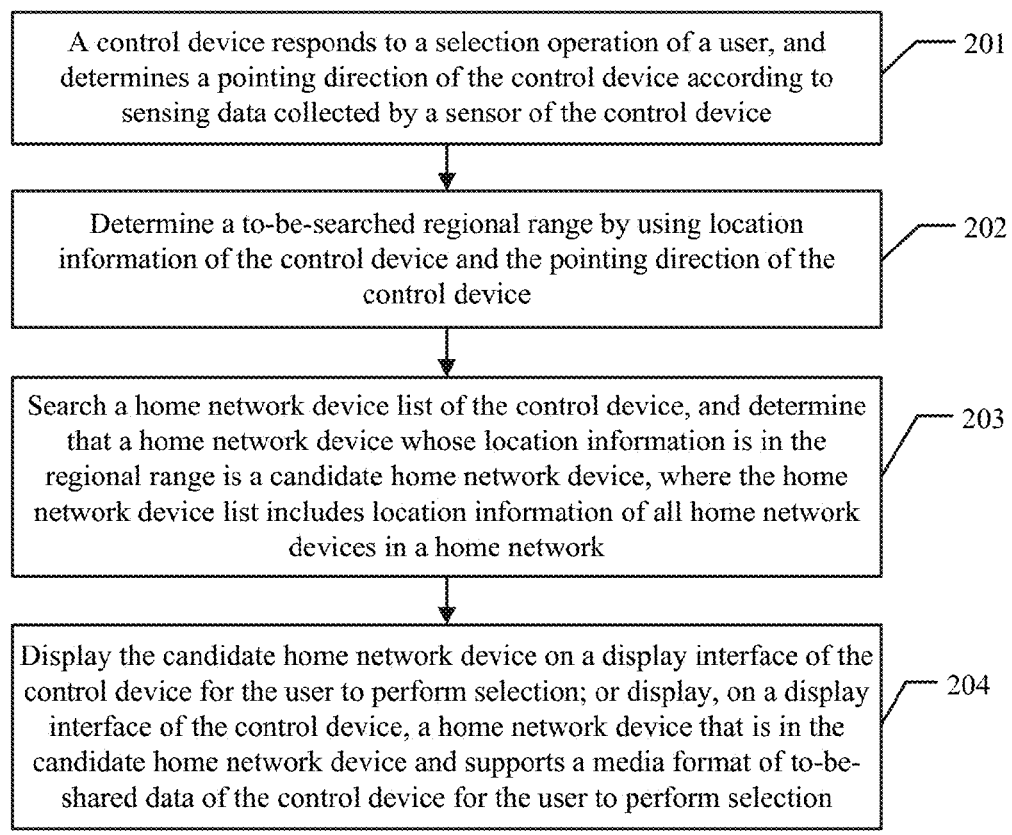
FIG. 2 is another schematic diagram of a device selection method according to an embodiment of the present invention.

In this embodiment of the present invention, the control device may determine, according to the pointing direction of the control device and/or the deflection angle of the control device, the home network device selected by the user, which will be described respectively below. Referring to FIG. 2, which shows a device selection method that is based on a pointing direction of a control device and is in an embodiment of the present invention, the method includes:

201. A control device responds to a selection operation of a user, and determines a pointing direction of the control device according to sensing data collected by a sensor of the control device.

In this embodiment of the present invention, the sensor may be a gyroscope, and the gyroscope may be used to determine a rotary angular velocity when the control device deflects and/or tilts. The rotary angular velocity obtained by sensing by the gyroscope when the control device deflects and/or tilts is the sensing data collectible by the gyroscope.

In this embodiment of the present invention, after determining that the user has performed a selection operation, the control device acquires the sensing data collected by the gyroscope when the user performs the selection operation, uses the sensing data to determine the direction pointed to by the control device, and uses the direction pointed to by the control device as the pointing direction of the control device.

It should be noted that, in this embodiment of the present invention, a reference of the direction pointed to by the control device is preset in the control device. Specifically, a direction pointed to outward straightly by a position or a part on the control device is the direction pointed to by the control device. For example, it is preset that a direction pointed to outward by the front top of the mobile phone is the direction pointed to by the mobile phone.

202. Determine a to-be-searched regional range by using location information of the control device and the pointing direction of the control device.

In this embodiment of the present invention, the control device uses the location information of the control device and the pointing direction of the control device to determine the to-be-searched regional range. For example, if the pointing direction of the control device is parallel to the Y axis of a reference coordinate system, and the direction is a direction of −y, and the location information of the control device in the reference coordinate system is (10, 10, 10), the to-be-searched regional range determined by using the location information of the control device and the pointing direction of the control device is an area whose start point on the Y axis is 10 and which falls in the −y direction, where locations on the X axis and the Z axis are not limited, and this area is the to-be-searched regional range.

203. Search a home network device list of the control device, and determine that a home network device whose location information is in the regional range is a candidate home network device, where the home network device list includes location information of all home network devices in a home network.

In this embodiment of the present invention, after obtaining the to-be-searched regional range, the control device searches the home network device list of the control device for location information of a home network device, and determines that the home network device whose location information is in the regional range is the candidate home network device.

In this embodiment of the present invention, the control device stores the home network device list, where the home network device list includes location information of all home network devices in the home network.

204. Display the candidate home network device on a display interface of the control device for the user to perform selection; or display, on a display interface of the control device, a home network device that is in the candidate home network device and supports a media format of to-be-shared data of the control device for the user to perform selection.

In this embodiment of the present invention, after obtaining the candidate home network device, the control device displays the candidate home network device on the display interface for the user to perform selection; or displays, on the display interface of the control device, the home network device that is in the candidate home network device and supports a media format of to-be-shared data of the control device for the user to perform selection.

Before performing the selection operation, the user may first specify the to-be-shared data, for example, audio data, video data, and picture data. The control device may determine the media format of the to-be-shared data.

In this embodiment of the present invention, a control device determines a candidate home network device in a home network according to a pointing direction of the control device, and displays the candidate home network device on a display interface, or displays, on a display interface, a home network device that is in the candidate home network device and supports a media format of to-be-shared data, thereby effectively reducing a quantity of home network devices displayed on the display interface, increasing a correctness rate of a user's selection of a home network device and improving user experience.

Figure 3:
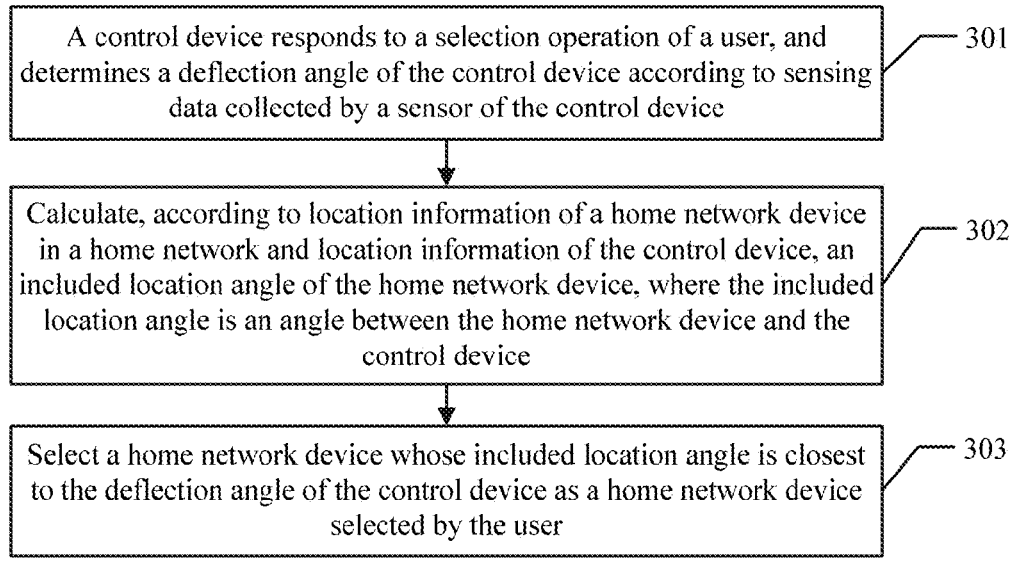
FIG. 3 is another schematic diagram of a device selection method according to an embodiment of the present invention.

The following describes a method for determining, by a control device based on a deflection angle of the control device, a home network device selected by a user. Referring to FIG. 3, which is an embodiment of a device selection method according to an embodiment of the present invention, the method includes:

301. A control device responds to a selection operation of a user, and determines a deflection angle of the control device according to sensing data collected by a sensor of the control device.

In this embodiment of the present invention, after the user performs a selection operation, the control device responds to the selection operation of the user, and determines the deflection angle of the control device according to sensing data collected by a sensor of the control device.

The sensor of the control device may be a gyroscope, and the gyroscope may be used to determine a rotary angular velocity when the control device deflects and/or tilts. The rotary angular velocity obtained by sensing by the gyroscope when the control device deflects and/or tilts is the sensing data collectible by the gyroscope.

302. Calculate, according to location information of a home network device in a home network and location information of the control device, an included location angle of the home network device, where the included location angle is an included angle between the home network device and the control device.

Figure 4:
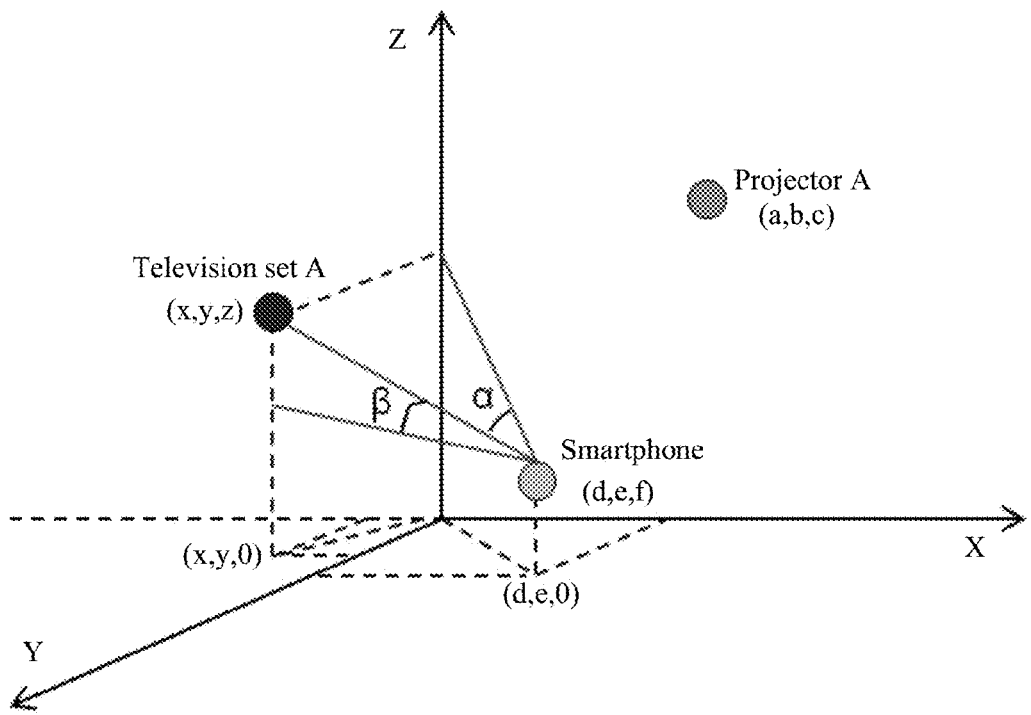
FIG. 4 is a schematic diagram of an included location angle according to an embodiment of the present invention.

In this embodiment of the present invention, after obtaining the candidate home network device, the control device calculates, according to the location information of the home network device and the location information of the control device, an included location angle of the candidate home network device, where the included location angle is an included angle between the candidate home network device and the control device. For example, referring to FIG. 4, FIG. 4 is a schematic diagram of an included location angle, An included location angle between television set A and a smartphone on a plane formed by the Z axis and the X axis is $\alpha$, and an included location angle between television set A and the smartphone on a plane formed by the X axis and the Y axis is $\beta$. It should be noted that, in this embodiment of the present invention, included location angles of a home network device includes an included location angle between the home network device and the control device on a plane formed by the X axis and the Y axis, an included location angle on a plane formed by the Y axis and the Z axis, and an included location angle on a plane formed by the X axis and the Z axis, based on a reference coordinate system.

303. Select a home network device whose included location angle is closest to the deflection angle of the control device as a home network device selected by the user.

In this embodiment of the present invention, the control device selects a home network device whose included location angle is closest to the deflection angle of the control device as the home network device selected by the user.

In this embodiment of the present invention, a control device may determine a deflection angle of the control device by using sensing data collected by a sensor, and by using the deflection angle of the control device and the included location angle of the home network device, determine a home network device selected by a user, which can effectively increase accuracy in determining a home network device selected by a user and improve user experience.

Figure 5:
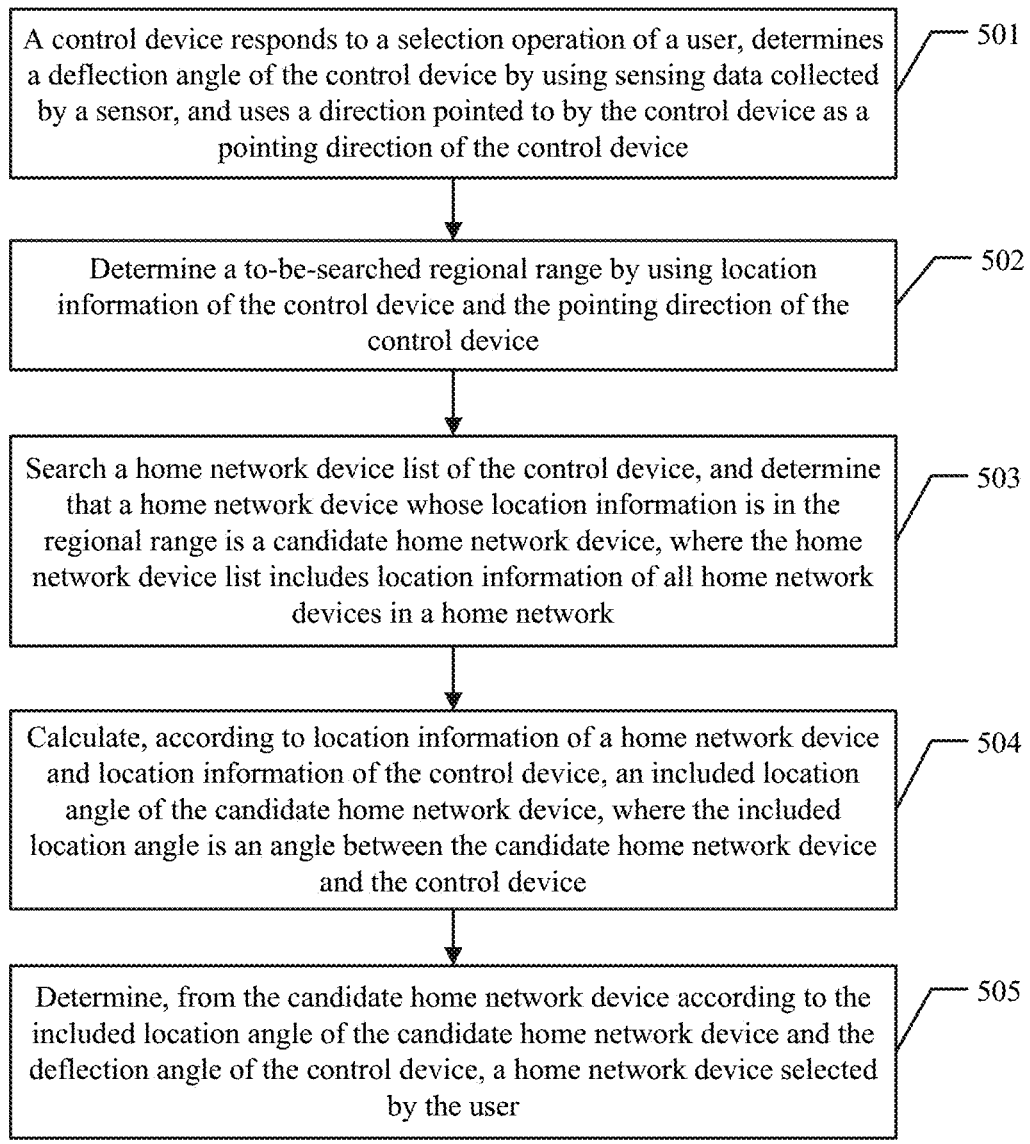
FIG. 5 is another schematic diagram of a device selection method according to an embodiment of the present invention.

The following describes a method for determining, based on a pointing direction of a control device and a deflection angle of the control device, a home network device selected by a user. Referring to FIG. 5, which is an embodiment of a device selection method according to an embodiment of the present invention, the method includes:

501. A control device responds to a selection operation of a user, determines a deflection angle of the control device by using sensing data collected by a sensor, and uses a direction pointed to by the control device as a pointing direction of the control device.

The sensor of the control device may be a gyroscope, and the gyroscope may be used to determine a rotary angular velocity when the control device deflects and/or tilts. The rotary angular velocity obtained by sensing by the gyroscope when the control device deflects and/or tilts is the sensing data collectible by the gyroscope.

In this embodiment of the present invention, after determining that the user has performed a selection operation, the control device responds to the selection operation, acquires the sensing data collected by the gyroscope when the user performs the selection operation, uses the sensing data to determine the deflection angle at which the control device executes the selection operation, and uses the direction pointed to by the control device as the pointing direction of the control device.

It should be noted that, in this embodiment of the present invention, a method for the control device to determine the direction pointed to by the control device is preset in the control device. Specifically, a method pointed to outward straightly by a position or a part on the control device is the direction pointed to by the control device. For example, it is preset that a direction pointed to outward by the front top of the mobile phone is the direction pointed to by the mobile phone.

In this embodiment of the present invention, after obtaining the pointing direction and deflection angle of the control device, the control device determines a candidate home network device in a home network according to the pointing direction of the control device, and selects, according to the deflection angle of the control device, a home network device from the candidate home network device as a home network device selected by the user, which is described in detail in steps 502 to 505.

502. Determine a to-be-searched regional range by using location information of the control device and the pointing direction of the control device.

In this embodiment of the present invention, the control device uses the location information of the control device and the pointing direction of the control device to determine the to-be-searched regional range. For example, if the pointing direction of the control device is parallel to the Y axis of a reference coordinate system, and the direction is a direction of −y, and the location information of the control device in the reference coordinate system is (10, 10, 10), the to-be-searched regional range determined by using the location information of the control device and execution of the control device is an area whose start point on the Y axis is 10 and which falls in the −y direction, where locations on the X axis and the Z axis are not limited, and this area is the to-be-searched regional range.

503. Search a home network device list of the control device, and determine that a home network device whose location information is in the regional range is a candidate home network device, where the home network device list includes location information of all home network devices in a home network.

In this embodiment of the present invention, after obtaining the to-be-searched regional range, the control device searches the home network device list of the control device for location information of a home network device, and determines that the home network device whose location information is in the regional range is the candidate home network device.

In this embodiment of the present invention, the control device stores the home network device list, where the home network device list includes location information of all home network devices in the home network.

504. Calculate, according to location information of a home network device and location information of the control device, an included location angle of the candidate home network device, where the included location angle is an included angle between the candidate home network device and the control device.

In this embodiment of the present invention, after obtaining the candidate home network device, the control device calculates, according to the location information of the home network device and the location information of the control device, the included location angle of the candidate home network device, where the included location angle is an included angle between the candidate home network device and the control device. For example, referring to FIG. 4, FIG. 4 is a schematic diagram of an included location angle. An included location angle between television set A and a smartphone on a plane formed by the Z axis and the X axis is $\alpha$, and an included location angle between television set A and the smartphone on a plane formed by the X axis and the Y axis is $\beta$. It should be noted that, in this embodiment of the present invention, included location angles of a home network device includes an included location angle between the home network device and the control device on a plane formed by the X axis and the Y axis, an included location angle on a plane formed by the Y axis and the Z axis, and an included location angle on a plane formed by the X axis and the Z axis, based on a reference coordinate system.

505. Determine, from the candidate home network device according to the included location angle of the candidate home network device and the deflection angle of the control device, a home network device selected by the user.

In this embodiment of the present invention, after obtaining the included location angle of the candidate home network device, the control device determines, from the candidate home network device according to the included location angle of the candidate home network device and the deflection angle of the control device, the home network device selected by the user.

In this embodiment of the present invention, that the control device determines, from the candidate home network device according to the included location angle of the candidate home network device and the deflection angle of the control device, the home network device selected by the user may specifically be as follows: If a proportion of a difference, which is between an included location angle of a home network device whose included location angle is closest to the deflection angle of the control device and the deflection angle of the control device, in the deflection angle is less than a preset value, determining that the home network device whose included location angle is closest to the deflection angle of the control device is the home network device selected by the user. For example, after the control device determines that a candidate home network device whose included location angle is closest to the deflection angle of the control device is a sounder, if an included location angle of the sounder is (a1, a2, a3), where a1 represents an included location angle on a plane formed by the X axis and the Y axis, a2 represents an included location angle on a plane formed by the X axis and the Z axis, and a3 represents an included location angle on a plane formed by the Y axis and the Z axis, and if the deflection angle of the control device is (b1, b2, b3), then it is calculated that A1=|(a1−b1)|/b1, A2=|(a2−b2)|/b2, and A3=|(a3−b3)|/b3, where A1, A2 and A3 are proportions of differences between the included location angles and deflection angles on different planes in the deflection angles. When A1, A2, and A3 are all less than a preset value, it may be determined that the sounder is the home network device selected by the user.

Alternatively, after the control device determines the included location angle of the candidate home network device, if the proportion of the difference, which is between an included location angle of a candidate home network device whose included location angle is closest to the deflection angle of the control device and the deflection angle of the control device, in the deflection angle is greater than or equal to the preset value, all candidate home network devices are displayed on a display interface of the control device, or a home network device that is in the candidate home network devices and supports a media format of to-be-shared data of the control device is displayed on a display interface of the control device, for the user to select a home network device. The control device may display the candidate home network devices by generating virtual images or displaying in a device list. For example, the user aims a mobile phone at a television wall, and according to a pointing direction of the mobile phone, determines that candidate home network devices include a television set, a sounder, a set top box, and the like, and displays them as pictures on a display interface of the mobile phone, so that the user can conveniently and accurately confirm a device that needs to be selected.

It should be noted that, if only one candidate home network device is determined by the control device, the control device may determine that the device is the selected device.

In this embodiment of the present invention, a control device uses data collected by a gyroscope to determine a deflection angle of the control device, uses a direction pointed to by the control device as a pointing direction of the control device, and determines a to-be-searched regional range by using the pointing direction and location information of the control device; searches a home network device list of the control device, determines that a home network device whose location information is in the regional range is a candidate home network device, and calculates, according to location information of a home network device and the location information of the control device, an included location angle of the candidate home network device; and if a proportion of a difference, which is between an included location angle of a home network device whose included location angle is closest to the deflection angle of the control device and the deflection angle of the control device, in the deflection angle is less than a preset value, determines that the home network device whose included location angle is closest to the deflection angle of the control device is a home network device selected by the user. In this way, the control device can determine the selected device according to the pointing direction and deflection angle of the control device, thereby avoiding a problem of difficult selection caused by a user's selection of a device from all home network devices, and effectively improving user experience. In addition, if the proportion of the difference, which is between an included location angle of a home network device whose included location angle is closest to the deflection angle of the control device and the deflection angle of the control device, in the deflection angle is greater than or equal to the preset value, all candidate home network devices are displayed on a display interface of the control device, for the user to select a home network device. Because only the candidate home network devices determined according to the pointing direction of the control device are displayed, the user's selection range can be reduced effectively, which can effectively avoid a problem of vulnerability to incorrect selection caused by a user's selection of a device from a large quantity of home network devices, and can also effectively improve user experience.

Figure 6:
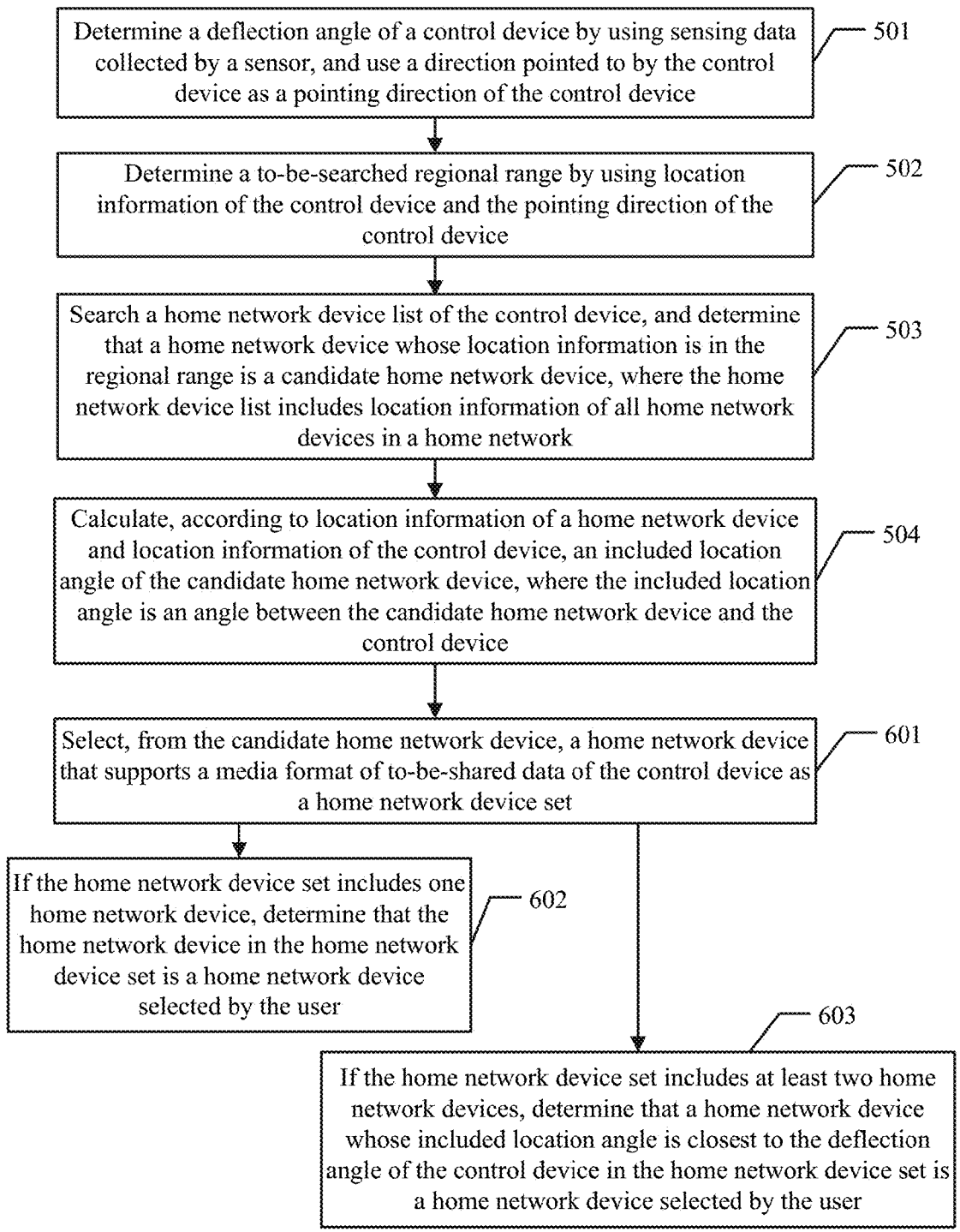
FIG. 6 is another schematic diagram of a device selection method according to an embodiment of the present invention.

In the technical solution described in the embodiment shown in Embodiment 5 according to the embodiment of the present invention, after calculating, according to the location information of the home network device and the location information of the control device, the included location angle of the candidate home network device, the control device may further determine, according to a media format of to-be-shared data of the control device, the home network device selected by the user. Referring to FIG. 6, which is an embodiment of a device selection method according to an embodiment of the present invention, the method includes:

After the control device executes steps 501 to 504 described in the embodiment shown in FIG. 5, step 505 may be executed according to the following steps:

601. Select, from the candidate home network device, a home network device that supports a media format of to-be-shared data of the control device as a home network device set, and perform step 602 or step 603.

602. If the home network device set includes one home network device, determine that the home network device in the home network device set is a home network device selected by the user.

603. If the home network device set includes at least two home network devices, determine that a home network device, in the home network device set, whose included location angle is closest to the deflection angle of the control device is a home network device selected by the user.

In this embodiment of the present invention, after obtaining the candidate home network device, the control device selects, from the candidate home network device, a home network device that supports a media format of to-be-shared data of the control device as a home network device set. In the control device, the control device may store media formats supported by all home network devices in the home network, and the media formats supported by the home network devices are obtained when the control device performs device discovery.

It should be noted that the technical solution described in the embodiment shown in FIG. 6 is applicable to a scenario in which the user has determined the media format of the to-be-shared data. For example, the user needs to push a video in a mobile phone to a television set for displaying, and therefore, the user may aim the mobile phone at the television set to perform a selection operation. The mobile phone determines a pointing direction and deflection angle of the mobile phone, and determines, according to the pointing direction and deflection angle of the mobile phone, that candidate home network devices include the television set, a set top box, and a sounder. Because only the television set supports video play, the mobile phone may determine that the television set is the device selected by the user.

In this embodiment of the present invention, if the obtained home network device set includes one home network device, the control device may determine that the home network device in the home network device set is the home network device selected by the user; if the obtained home network device set includes at least two home network devices, the control device determines that a home network device, in the home network device set, whose included location angle is closest to the deflection angle of the control device is the home network device selected by the user; and if the obtained home network device set includes no home network device, that is, the candidate home network device include no home network device supporting the media format of the to-be-shared data of the control device, the control device displays prompt information on the display interface to remind that no home network device supporting the media format of the to-be-shared data of the control device is found.

In this embodiment of the present invention, a control device determines a to-be-searched regional range by using a pointing direction and a deflection angle of a control device, determines a candidate home network device in the regional range, and determines, from the candidate home network device, a set of a home network device that supports a media format of to-be-shared data of the control device, so as to determine a home network device selected by the control device, which can effectively avoid a problem of selection difficulty and vulnerability to errors caused by a user's selection of a device from all home network devices, and effectively improve user experience.

Figure 7:
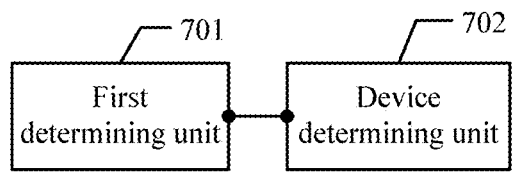
FIG. 7 is a schematic diagram of a structure of a control device according to an embodiment of the present invention.

Referring to FIG. 7, which is an embodiment of a structure of a control device according to an embodiment of the present invention, the control device includes:

a first determining unit 701, configured for the control device to respond to a selection operation of a user, and determine a pointing direction of the control device and/or a deflection angle of the control device according to sensing data collected by a sensor of the control device; and a device determining unit 702, configured to: after the first determining unit 701 determines the pointing direction of the control device and/or the deflection angle of the control device, determine, according to the pointing direction of the control device and/or the deflection angle of the control device, a home network device selected by the user.

In this embodiment of the present invention, the first determining unit 701 responds to a selection operation of the user after detecting the selection operation of the control device, and determines the pointing direction of the control device and/or the deflection angle of the control device according to the sensing data collected by the sensor of the control device. According to the pointing direction of the control device and/or the deflection angle of the control device, the device determining unit 702 determines the home network device selected by the user.

In this embodiment of the present invention, a control device responds to a selection operation of a user, and determines a pointing direction of the control device and/or a deflection angle of the control device according to sensing data collected by a sensor of the control device; and determines, according to the pointing direction of the control device and/or the deflection angle of the control device, a home network device selected by the user. In this way, the control device can effectively increase a correctness rate of home network device selection and improve user experience.

Figure 8:
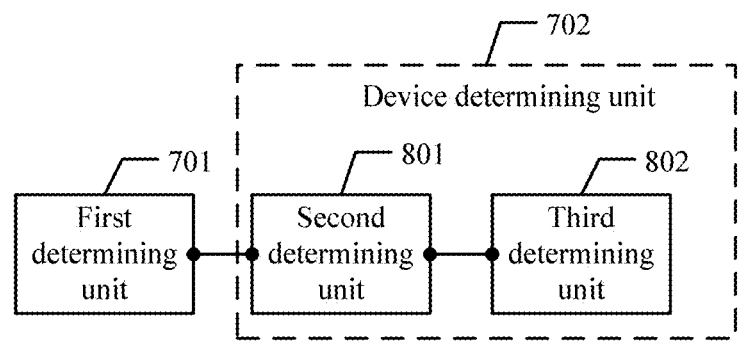
FIG. 8 is another schematic diagram of a structure of a control device according to an embodiment of the present invention.

Referring to FIG. 8, which is an embodiment of a structure of a control device according to an embodiment of the present invention, the control device includes:

the first determining unit 701 and device determining unit 702 described in the embodiment shown in FIG. 7, which are similar to content described in the embodiment shown in FIG. 7, and details are not described herein again.

In this embodiment of the present invention, the device determining unit 702 includes:

a second determining unit 801, configured to: after the first determining unit 701 determines the pointing direction of the control device, search a home network device list of the control device, and determine that a home network device whose location information is in the regional range is a candidate home network device, where the home network device list includes location information of all home network devices in a home network; and a third determining unit 802, configured to: after the second determining unit 801 obtains the candidate home network device, display the candidate home network device on a display interface of the control device for the user to perform selection; or display, on a display interface of the control device, a home network device that is in the candidate home network device and supports a media format of to-be-shared data of the control device for the user to perform selection.

In this embodiment of the present invention, after the first determining unit 701 obtains the pointing direction of the control device by using the sensing data, the second determining unit 801 in the device determining unit 702 searches the home network device list of the control device, and determines that the home network device whose location information is in the regional range is the candidate home network device, where the home network device list includes location information of all home network devices in a home network; and the third determining unit 802 displays the candidate home network device on a display interface of the control device for the user to perform selection, or displays, on a display interface of the control device, the home network device that is in the candidate home network device and supports a media format of to-be-shared data of the control device for the user to perform selection.

In this embodiment of the present invention, a control device determines a candidate home network device in a home network according to a pointing direction of the control device; and displays the candidate home network device on a display interface, or displays, on a display interface, a home network device that is in the candidate home network device and supports a media format of to-be-shared data, thereby effectively reducing a quantity of home network devices displayed on the display interface, increasing a correctness rate of a user's selection of a home network device and improving user experience.

Figure 9:
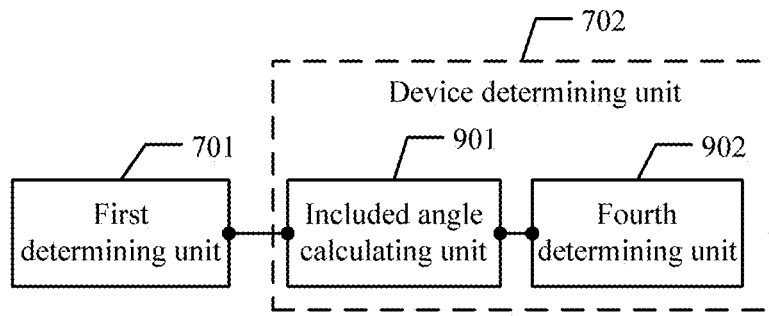
FIG. 9 is another schematic diagram of a structure of a control device according to an embodiment of the present invention.

Referring to FIG. 9, which is an embodiment of a structure of a control device according to an embodiment of the present invention, the control device includes:

the first determining unit 701 and device determining unit 702 described in the embodiment shown in FIG. 7, which are similar to content described in the embodiment shown in FIG. 7, and details are not described herein again.

The device determining unit 702 includes:

an included angle calculating unit 901, configured to: after the first determining unit 701 determines the deflection angle of the control device, calculate, according to location information of a home network device in a home network and location information of the control device, an included location angle of the home network device, where the included location angle is an included angle between the home network device and the control device; and a fourth determining unit 902, configured to: after the included angle calculating unit 901 determines the included location angle of the home network device, select a home network device whose included location angle is closest to the deflection angle of the control device as the home network device selected by the user.

In this embodiment of the present invention, a control device may determine a deflection angle of the control device by using sensing data collected by a sensor, and by using the deflection angle of the control device and the included location angle of the home network device, determine a home network selected by a user, which can effectively increase accuracy in determining a home network device selected by a user and improve user experience.

Figure 10:
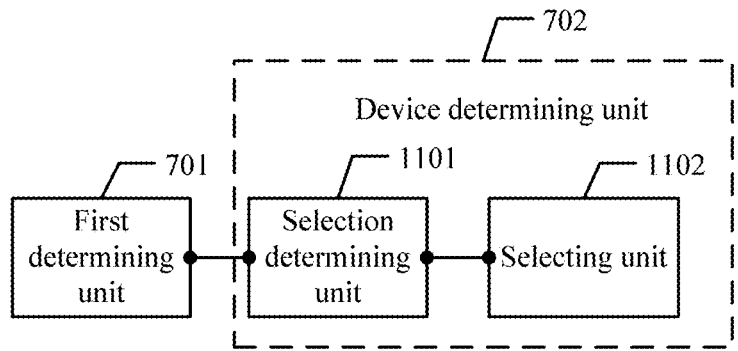
FIG. 10 is another schematic diagram of a structure of a control device according to an embodiment of the present invention.

Referring to FIG. 10, which is an embodiment of a structure of a control device according to an embodiment of the present invention, the control device includes:

the first determining unit 701 and device determining unit 702 described in the embodiment shown in FIG. 7, which are similar to content described in the embodiment shown in FIG. 7, and details are not described herein again;

a selection determining unit 1001, configured to: after the first determining unit 701 determines the pointing direction of the control device and the deflection angle of the control device, determine a candidate home network device in a home network according to the pointing direction of the control device; and a selecting unit 1002, configured to: after the selection determining unit 1001 determines the candidate home network device, select, according to the deflection angle of the control device, a home network device from the candidate home network device as the home network device selected by the user.

In this embodiment of the present invention, the first determining unit 701 in the control device determines the pointing direction of the control device and the deflection angle of the control device according to the sensing data collected by the sensor of the control device; subsequently, the selection determining unit 1001 in the device determining unit 702 determines the candidate home network device in the home network according to the pointing direction of the control device; and according to the deflection angle of the control device, the selecting unit 1002 in the device determining unit 702 selects a home network device from the candidate home network device as the home network device selected by the user.

In this embodiment of the present invention, a control device determines a pointing direction of the control device and a deflection angle of the control device according to sensing data collected by a sensor of the control device; determines a candidate home network device in a home network according to the pointing direction of the control device, and selects, according to the deflection angle of the control device, a home network device from the candidate home network device as a home network device selected by the user. In this way, the control device implements selection of a home network device, avoids a problem of difficult selection caused by a user's selection of a home network device, and can effectively improve user experience.

Figure 11:
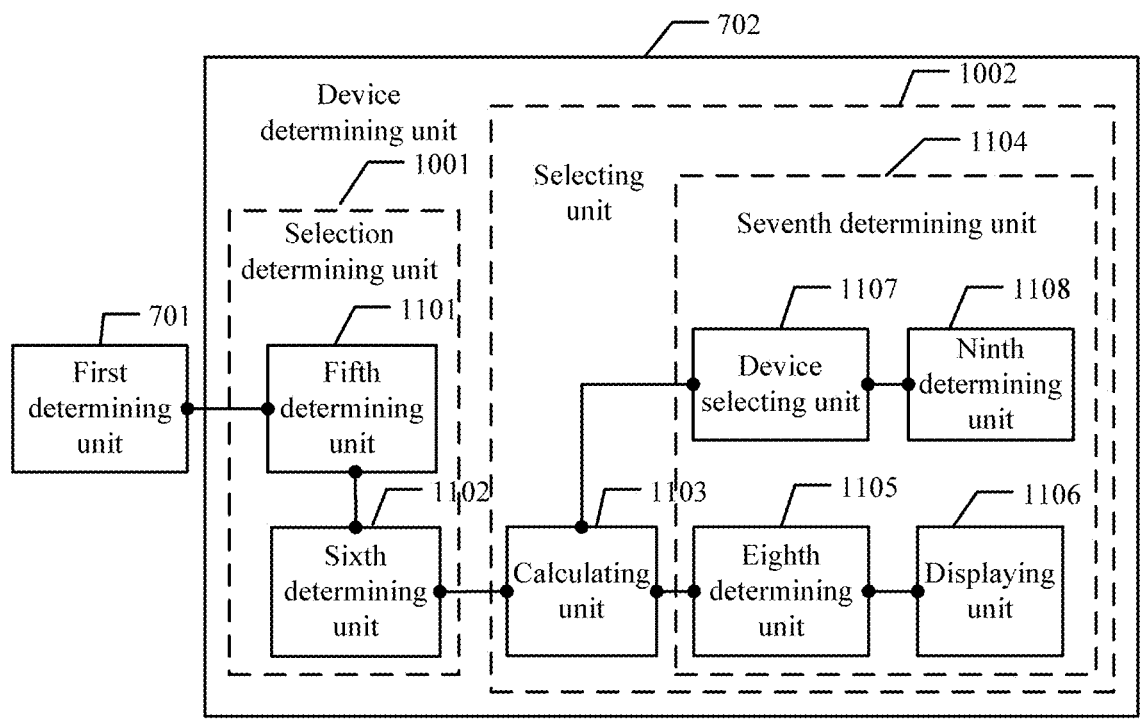
FIG. 11 is another schematic diagram of a structure of a control device according to an embodiment of the present invention.

For better understanding of the technical solution in the embodiment of the present invention, refer to FIG. 11, which is an embodiment of a structure of a control device according to an embodiment of the present invention. The control device includes:

the first determining unit 701, device determining unit 702, selection determining unit 1001, and selecting unit 1002 described in the embodiment shown in FIG. 10, which are similar to content described in the embodiment shown in FIG. 10, and details are not described herein again.

In this embodiment of the present invention, the sensor may be a gyroscope.

In this embodiment of the present invention, the selection determining unit 1001 includes:

a fifth determining unit 1101, configured to: after the first determining unit 701 obtains the pointing direction and deflection angle of the control device, determine a to-be-searched regional range by using location information of the control device and the pointing direction of the control device; and a sixth determining unit 1102, configured to: after the fifth determining unit 1101 obtains the regional range, search a home network device list of the control device, and determine that a home network device whose location information is in the regional range is a candidate home network device, where the home network device list includes location information of all home network devices in the home network.

In this embodiment of the present invention, the selecting unit 1002 includes:

a calculating unit 1103, configured to: after the selection determining unit 1001 obtains the candidate home network device, calculate, according to location information of the candidate home network device and location information of the control device, an included location angle of the candidate home network device, where the included location angle is an included angle between the candidate home network device and the control device; and a seventh determining unit 1104, configured to: after the calculating unit 1103 obtains the included location angle of the candidate home network device, determine, from the candidate home network device according to the included location angle of the candidate home network device and the deflection angle of the control device, the home network device selected by the user.

The seventh determining unit 1104 includes:

an eighth determining unit 1105, configured to: after the calculating unit 1103 obtains the included location angle of the candidate home network device, if a proportion of a difference, which is between an included location angle of a candidate home network device whose included location angle is closest to the deflection angle of the control device and the deflection angle of the control device, in the deflection angle is less than a preset value, determine that the candidate home network device whose included location angle is closest to the deflection angle of the control device is the home network device selected by the user; and a displaying unit 1106, configured to: after the calculating unit 1103 obtains the included location angle of the candidate home network device, if the proportion of the difference, which is between an included location angle of a candidate home network device whose included location angle is closest to the deflection angle of the control device and the deflection angle of the control device, in the deflection angle is greater than or equal to the preset value, display the candidate home network device on a display interface of the control device for the user to select a home network device, or display, on a display interface of the control device, a home network device that is in the candidate home network device and supports a media format of to-be-shared data of the control device for the user to perform selection.

In this embodiment of the present invention, the seventh determining unit 1104 further includes:

a device selecting unit 1107, configured to: after the calculating unit 1103 obtains the included location angle of the candidate home network device, select, from the candidate home network device, a home network device that supports a media format of to-be-shared data of the control device as a home network device set; and a ninth determining unit 1108, configured to: after the device selecting unit 1107 determines the home network device set, if the home network device set includes one home network device, determine that the home network device in the home network device set is the home network device selected by the user; and further configured to: if the home network device set includes at least two home network devices, determine that a home network device, in the home network device set, whose included location angle is closest to the deflection angle of the control device is the home network device selected by the user.

In this embodiment of the present invention, the first determining unit 701 in the control device uses the sensing data collected by the gyroscope to determine the deflection angle of the control device, uses a direction pointed to by the control device as the pointing direction of the control device; subsequently, the fifth determining unit 1101 in the selection determining unit 1001 determines the to-be-searched regional range by using the location information of the control device and the pointing direction of the control device; and the sixth determining unit 1102 in the selection determining unit 1001 searches the home network device list of the control device, and determines that the home network device whose location information is in the regional range is the candidate home network device, where the home network device list includes the location information of all home network devices in the home network. Subsequently, the calculating unit 1103 in the selecting unit 1002 calculates, according to the location information of the candidate home network device and the location information of the control device, the included location angle of the candidate home network device, where the included location angle is an included angle between the candidate home network device and the control device; and the seventh determining unit 1104 determines, from the candidate home network device according to the included location angle of the candidate home network device and the deflection angle of the control device, the home network device selected by the user.

That the seventh determining unit 1104 determines, from the candidate home network device according to the included location angle of the candidate home network device and the deflection angle of the control device, the home network device selected by the user may be as follows: If a proportion of a difference, which is between an included location angle of a candidate home network device whose included location angle is closest to the deflection angle of the control device and the deflection angle of the control device, in the deflection angle is less than a preset value, the eighth determining unit 1105 in the seventh determining unit 1104 determines that the candidate home network device whose included location angle is closest to the deflection angle of the control device is the home network device selected by the user; and if the proportion of the difference, which is between an included location angle of a candidate home network device whose included location angle is closest to the deflection angle of the control device and the deflection angle of the control device, in the deflection angle is greater than or equal to the preset value, the displaying unit 1106 in the seventh determining unit 1104 displays the candidate home network device on a display interface of the control device, or displays, on a display interface of the control device, a home network device that is in the candidate home network device and supports a media format of to-be-shared data of the control device, for the user to select a home network device.

Alternatively, after the calculating unit 1103 in the control device obtains the included location angle of the candidate home network device, the device selecting unit 1107 in the seventh determining unit 1104 selects, from the candidate home network device, a home network device that supports a media format of to-be-shared data of the control device as a home network device set. If the home network device set includes one home network device, the ninth determining unit 1108 determines that the home network device in the home network device set is the home network device selected by the user; and if the home network device set includes at least two home network devices, the ninth determining unit 1108 determines that a home network device, in the home network device set, whose included location angle is closest to the deflection angle of the control device is the home network device selected by the user.

In this embodiment of the present invention, a control device uses data collected by a gyroscope to determine a deflection angle of the control device, uses a direction pointed to by the control device as a pointing direction of the control device, and determines a to-be-searched regional range by using the pointing direction and location information of the control device; searches a home network device list of the control device, determines that a home network device whose location information is in the regional range is a candidate home network device, and calculates, according to location information of a home network device and the location information of the control device, an included location angle of the candidate home network device; and if a proportion of a difference, which is between an included location angle of a home network device whose included location angle is closest to the deflection angle of the control device and the deflection angle of the control device, in the deflection angle is less than a preset value, determines that the home network device whose included location angle is closest to the deflection angle of the control device is a home network device selected by the user. In this way, the control device can determine the selected device according to the pointing direction and deflection angle of the control device, thereby avoiding a problem of difficult selection caused by a user's selection of a device from all home network devices, and effectively improving user experience. In addition, if the proportion of the difference, which is between an included location angle of a home network device whose included location angle is closest to the deflection angle of the control device and the deflection angle of the control device, in the deflection angle is greater than or equal to the preset value, all candidate home network devices are displayed on a display interface of the control device, for the user to select a home network device. Because only the candidate home network devices determined according to the pointing direction of the control device are displayed, the user's selection range can be reduced effectively, which can effectively avoid a problem of vulnerability to incorrect selection caused by a user's selection of a device from a large quantity of home network devices, and can also effectively improve user experience.

Alternatively, in this embodiment of the present invention, the control device determines a to-be-searched regional range by using a pointing direction of the control device, determines a candidate home network device in the regional range, and determines a set of a home network device that supports a media format of to-be-shared data of the control device, and then determines, in the home network device set, a home network device selected by the control device, thereby effectively increasing a correctness rate of home network device selection and improving user experience.

Figure 12:
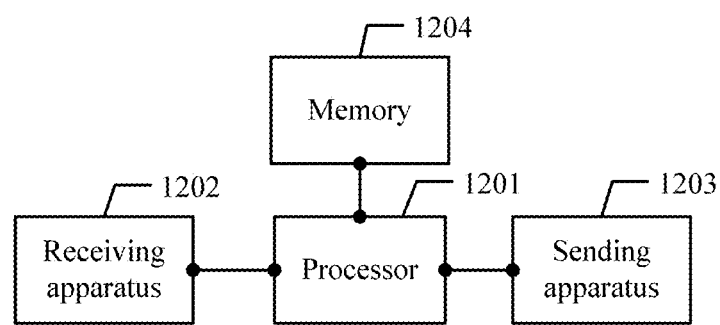
FIG. 12 is another schematic diagram of a structure of a control device according to an embodiment of the present invention.

Referring to FIG. 12, which is an embodiment of a structure of a control device according to an embodiment of the present invention, the control device includes:

a processor 1201, a receiving apparatus 1202, a sending apparatus 1203, and a memory 1204.

The processor 1201 is configured to: determine a pointing direction of the control device and a deflection angle of the control device according to sensing data collected by a sensor of the control device; determine a candidate home network device in a home network according to the pointing direction of the control device; and determine, according to the pointing direction of the control device and/or the deflection angle of the control device, a home network device selected by the user.

A person of ordinary skill in the art may understand that all or some of the steps of the methods in the embodiments may be implemented by a program instructing relevant hardware. The program may be stored in a computer readable storage medium. The storage medium may include: a read-only memory, a magnetic disk, or an optical disc.

A device selection method and apparatus according to the present invention has been described in detail. With respect to the specific implementation manner and application scope of the present invention, modifications and variations may be made by a person of ordinary skill in the art according to the ideas of the embodiments of the present invention. Therefore, the content of the specification shall not be construed as a limitation on the present invention.

What is claimed is:

1. A device selection method, comprising:
   responding, by a control device, to a selection operation of a user, and determining, according to sensing data collected by a sensor of the control device, a pointing direction of the control device and a deflection angle of the control device;
   determining a first plurality of candidate home network devices in a home network according to the pointing direction of the control device;
   calculating, according to location information of the first plurality of candidate home network devices in the home network and location information of the control device, an included location angle of each respective home network device of the first plurality of candidate home network devices, wherein the included location angle of the respective home network device is an included angle between the respective home network device and the control device;
   selecting a first subset of the first plurality of candidate home network devices whose included location angles are within a preset value of the deflection angle of the control device, wherein the first subset of the first plurality of candidate home network devices comprises at least two candidate home network devices of the first plurality of candidate home network devices; and
   determining a home network device selected by the user from the first subset of the first plurality of candidate home network devices according to whether the respective home network devices of the first subset support presentation of to-be-shared data of the control device according to a media format of the to-be-shared data of the control device, wherein determining the home network device selected by the user comprises:
   determining, in response to a proportion of a difference between the included location angle of a respective candidate home network device of the first subset of the first plurality of candidate home network devices whose included location angle is closest to the deflection angle of the control device and the deflection angle of the control device being less than the preset value, that the respective candidate home network device whose included location angle is closest to the deflection angle of the control device is the home network device selected by the user; and displaying on a display interface of the control device, in response to the proportion of the difference between the included location angle of the first subset of the first plurality of candidate home network devices whose included location angle is closest to the deflection angle of the control device and the deflection angle of the control device being greater than or equal to the preset value, a second plurality of candidate home network devices from the first subset of the first plurality of candidate home network devices, wherein each candidate home network device in the second plurality of candidate home network devices supports presentation of the to-be-shared data of the control device according to the media format of the to-be-shared data of the control device, for the user to perform selection.

2. A device selection method, comprising:

responding, by a control device, to a selection operation of a user, and determining, according to sensing data collected by a sensor of the control device, a pointing direction of the control device and a deflection angle of the control device;

determining a first plurality of candidate home network devices in a home network according to the pointing direction of the control device;

calculating, according to location information of the first plurality of candidate home network devices in the home network and location information of the control device, an included location angle of each respective home network device of the first plurality of candidate home network devices, wherein the included location angle of the respective home network device is an included angle between the respective home network device and the control device;

selecting a first subset of the first plurality of candidate home network devices whose included location angles are within a preset value of the deflection angle of the control device, wherein the first subset of the first plurality of candidate home network devices comprises at least two candidate home network devices of the first plurality of candidate home network devices; and determining a home network device selected by the user from the first subset of the first plurality of candidate home network devices according to whether the respective home network devices of the first subset support presentation of to-be-shared data of the control device according to a media format of the to-be-shared data of the control device, wherein determining the home network device selected by the user comprises:

selecting, from the first subset of the first plurality of candidate home network devices, home network devices that support presentation of the to-be-shared data of the control device according to the media format of the to-be-shared data of the control device as a home network device set;

determining, in response to the home network device set having one home network device, that the home network device of the home network device set is the home network device selected by the user; and determining in response to the home network device set having at least two home network devices, that a home network device of the home network device set whose included location angle is closest to the deflection angle of the control device is the home network device selected by the user.

3. A control device, comprising a memory storing instructions, the instructions being executable by a processor to:

respond to a selection operation of a user;

determine a pointing direction of the control device and a deflection angle of the control device according to sensing data collected by a sensor of the control device;

determine a first plurality of candidate home network devices in a home network according to the pointing direction of the control device;

calculate, according to location information of the first plurality of candidate home network devices in the home network and location information of the control device, an included location angle of each respective home network device of the first plurality of candidate home network devices, wherein the included location angle of the respective home network device is an included angle between the respective home network device and the control device;

select a first subset of the first plurality of candidate home network devices whose included location angles are within a preset value of the deflection angle of the control device, wherein the first subset of the first plurality of candidate home network devices comprises at least two candidate home network devices of the first plurality of candidate home network devices; and determine a home network device selected by the user from the first subset of the first plurality of candidate home network devices according to whether the respective home network devices of the first subset support presentation of to-be-shared data of the control device according to a media format of the to-be-shared data of the control device, wherein the instructions executable by the processor to determine the home network device selected by the user comprise instructions executable by the processor to:

determine, in response to a proportion of a difference between the included location angle of a respective candidate home network device of the first subset of the first plurality of candidate home network devices whose included location angle is closest to the deflection angle of the control device and the deflection angle of the control device being less than the preset value, that the respective candidate home network device whose included location angle is closest to the deflection angle of the control device is the home network device selected by the user; and display on a display interface of the control device, in response to the proportion of the difference between the included location angle of the first subset of the first plurality of candidate home network devices whose included location angle is closest to the deflection angle of the control device and the deflection angle of the control device being greater than or equal to the preset value, a second plurality of candidate home network devices from the first subset of the first plurality of candidate home network devices, wherein each candidate home network device in the second plurality of candidate home network devices supports presentation of the to-beshared data of the control device according to the media format of the to-be-shared data of the control device, for the user to perform selection.

* * * * *

UNITED STATES PATENT AND TRADEMARK OFFICE
CERTIFICATE OF CORRECTION

PATENT NO. : 10,291,427 B2  
APPLICATION NO. : 14/837971  
DATED : May 14, 2019  
INVENTOR(S) : Yajun Zhang Page 1 of 1

It is certified that error appears in the above-identified patent and that said Letters Patent is hereby corrected as shown below:

On the Title Page

Item (73) Assignee, Line 1-2, delete "Shenzhen (CN)" and insert --Dongguan (CN)--.

Signed and Sealed this  
Seventh Day of April, 2020

Andrei Iancu  
*Director of the United States Patent and Trademark Office*